United States Patent Office 3,051,658
Patented Aug. 28, 1962

3,051,658
PROCESS OF DECREASING THE SALT CONTENT OF AN ACIDIC SILICA HYDRO-ORGANOSOL
Wilson H. Power, Des Peres, Mo., assignor to Monsanto Chemical Company, St. Louis, Mo., a corporation of Delaware
No Drawing. Filed Sept. 19, 1958, Ser. No. 761,958
11 Claims. (Cl. 252—306)

The present invention relates to acidic silica sols which are substantially free of salts, and to processes of producing acidic silica sols which are free of salts or have a very low salt content. The present invention also relates to silica aerogels which are substantially free of salts, and to processes of producing silica aerogels which are free of salts or have a very low salt content.

It has been proposed heretofore in the United States Patent No. 2,285,477 to John F. White, patented June 9, 1942, to prepare acidic silica alcosols, and silica aerogels from acidic silica alcosols. According to this White patent an acidic aqueous colloidal silica solution is first prepared by mixing a mineral acid and an alkali silicate solution at a pH of about 1.8 to 4.5. Before the resulting sol has solidified to the gel form, an organic solvent (for example, ethanol), miscible with water, is added to give a mixed hydro-organosol. The addition of this organic solvent and cooling of the sol causes a substantial portion of the inorganic salt to precipitate, and upon removal of the precipitated salt a sol is obtained which varies in stability depending on the pH of the sol, the amount of inorganic salt remaining in the sol and the temperature at which the sol is stored. In any event, the sols thus obtained have limited stability, usually varying from an hour or less up to about 2 weeks, and hence are considerably less stable toward gelation than alkaline silica aquasols which usually have a stability of several months and longer at normal room temperatures. The alcosols of the White patent may be autoclaved in the same way that the alcogels are treated by the process of United States Patent No. 2,093,454 to Samuel S. Kistler, patented September 21, 1937, to give an aerogel product.

The hydro-organosols of the White patent contain varying amounts of inorganic salt depending on the acid and silicate employed, the concentration of organic solvent and silica in the sol, the temperature of the sol and other factors. However, the minimum inorganic salt concentration in the sol is about 0.1 to 0.3% by weight based on the sol. This salt content is objectional for certain uses of the sol, for example, when it is desired to produce a silica coating or film having low electric conductivity or water-sensitivity, from the sol. Moreover, when the sol is autoclaved to form a silica aerogel, the minimum quantity of inorganic salt is about 1 to 3% by weight on the aerogel. Because of this relatively high electrolyte content the aerogel is not entirely satisfactory as a filler in silicone rubbers which are to be used as electric insulating materials, or in other applications where low electric conductivity is essential. The above remarks with respect to the sols of the White patent, and the aerogels produced therefrom, also apply to the acidic hydro-organosols produced by the process of the United States Patent No. 2,285,449 to Morris D. Marshall, patented June 9, 1942, and to the aerogels prepared from such sols.

In the Kistler patent referred to above, reference is made to the preparation of silica aerogels from silica alcogels. According to this patent a silica hydrogel is first prepared from sodium silicate acidified with sulfuric acid. The silica hydrogel is washed with water and the water in the hydrogel is then replaced by a water-miscible liquid having a lower critical temperature than water, for example, ethanol, to form a silica alcogel. This alcogel is charged to an autoclave which is nearly filled with liquid, the liquid being the same as that contained in the alcogel, and the autoclave is then closed. The whole mass in the autoclave is then slowly heated until the temperature exceeds the critical temperature of the liquid in the autoclave, during which time only enough vapor is released to prevent excessive pressures but not enough vapor is released to produce substantial drying of the gel. The gas in the autoclave is then released at a rate insufficient to damage the gel. The resulting gel, which is an aerogel, occupies substantially the same volume as the alcogel from which it is prepared.

The aerogels produced according to the process of the above Kistler patent contain some quantities of salts which make them generally unsuitable for certain uses, particularly where the material is used in electrical insulators. This is due to the circumstance that the starting hydrogel contains salt which is held tenaciously by the gel structure and it has been found to be virtually impossible to remove substantially all or all of the salts present in the silica hydrogel by washing with water using conventional techniques. It has also been found that it is impossible to rid the hydrogel of metallic cations by using wash water of ordinary hardness because the silica hydrogel absorbs metallic cations from such wash water.

The present invention relates to an improvement on the processes and products disclosed in the White, Marshall and Kistler patents hereinbefore referred to. In accordance with the present invention it is possible to remove all or substantially all of the salt from an acidic silica hydro-organosols, and it is also possible to prepare from the resulting sol silica aerogels which are free or substantially free of salts or other electrolytes. The resulting aerogels have a utility in electrical insulating compositions which is not shared by the silica aerogels of the prior art referred to above.

It is, accordingly, one object of this invention to provide acidic silica hydro-organosols, particularly acidic silica ethanol-aquasols, which are free or substantially free of salts.

It is a further object of this invention to provide a process of producing acidic silica hydro-organosols, particularly acidic silica ethanol-aquasols, which are free or substantially free of salts.

It is a further object of this invention to provide silica aerogels which are free or substantially free of salts and contain no or inappreciable amounts of other electrolytes.

It is further object of this invention to provide a process of producing silica aerogels which are free or substantially free of salts from acidic silica hydro-organosols, particularly acidic silica ethanol-aquasols.

Still further objects and advantages of this invention will become apparent from the following description and the appended claims.

In my copending application Serial No. 549,872, filed November 29, 1955, now abandoned, which is a continuation-in-part of application Serial No. 451,299, filed August 20, 1954, now abandoned, there is described a process of producing an acidic silica hydro-organosol of extremely low salt content by contacting an acidic silica hydro-organosol containing a mineral acid and varying amounts of a salt of a mineral acid and an alkali silicate, say amounts of 0.1 to 0.6% by weight, with the hydrogen form of a water-insoluble, strong cation-exchange material and a volatile organic acid salt of a water-insoluble, weak anion-exchange material containing a plurality of salt-forming nitrogen atoms, the contacting with each exchange material being done simultaneously or in any desired sequence, until the acidic hydro-organosol is free or substantially free of such salt. The resulting sol is not only substantially salt free, but has an acidity which is due primarily to the presence of a volatile organic acid which has been substituted for at least part of the mineral acid present in the original or starting sol. The substantially salt-free sol has a variety of uses, but it is particularly suitable for the preparation of substantially electrolyte-free silica aerogels which can be used as fillers in silicone rubbers used for electrical insulating purposes.

White sols and aerogels of the type described in said copending applications are desirable and have excellent utility for a wide variety of purposes, there are instances where it is desired to use acidic silica hydro-organosols which are free or substantially free of salts and are free or substantially free of organic acids. The present invention is directed to the preparation of the latter type of sols.

In my copending application referred to above, it is indicated therein that the base form of anion-exchange materials, in general, and also the base form of weak anion-exchange materials, are generally unsuitable for use in removing anions of mineral acids from acidic silica hydro-organosols containing a salt of such acid and an alkali. This is generally true, but in accordance with the present invention it is possible to employ the base form of weak anion-exchange materials to substantially reduce the anion concentration of mineral acid anions in an acidic hydro-organosol by the use of such exchange material under certain specified conditions as will be described in greater detail hereinafter.

In accordance with the present invention, it is possible to remove all or substantially all of the residual dissolved salt in an acidic silica hydro-organosol by contacting such a sol with a strong cation-exchange material which is capable of absorbing metallic cations from an acidic hydro-organo solution and with the base form of a weak anion-exchange material containing a plurality of salt-forming nitrogen atoms provided that the pH of the sol does not exceed 4.5 during contact with such exchange materials. The resulting sol has a pH of 2.5 to 4.5 due primarily to the presence of a mineral acid and/or acid salt thereof such as sulfuric acid and/or sodium hydrogen sulfate and the like, present in the original sol. If an aerogel is desired, the liquid phase of the sol is removed without subjecting the gel, formed from the sol during heating, to compressive forces which would cause appreciable shrinkage of the gel. In carrying out the process of this invention, it is possible to contact the salt containing acidic silica hydro-organosol with the anion and cation-exchange materials simultaneously or in any sequence provided the pH of the sol does not exceed 4.5 and the pH does not drop below certain values as hereinafter described.

Although it is known that salts can be removed from aqueous solutions thereof by contacting such solutions with cation and anion-exchange materials, it could not be predicted or foreseen that the removal of salts from acidic silica hydro-organosols could be accomplished by the use of such material due to the presence of organic liquids in such sols, due to the tendency of such sols to gel rapidly with relatively slight upward changes in pH and also due to the tendency of the silica and/or silicic acid in such sols to be absorbed on the anion-exchange resin, particularly when it is considered that certain anion-exchange resins have been used to remove silica from aqueous solutions. However, the present invention provides a practical process for removing salts from such sols which avoids gelation of the sol for practical periods of time and minimizes the absorption of colloidal silica and/or silicic acid by the anion-exchange material.

The initial or starting acidic silica hydro-organosols employed in this invention can be, and preferably are, prepared according to the processes described in the White and Marshall patents hereinbefore referred to. The processes of these patents comprise, in general, first forming an acidic sol having a pH between 1.8 and 4.5 by acidifying a water-soluble alkali silicate such as sodium silicate with a mineral acid such as sulfuric acid, in the proper proportions to give such a pH, and then adding a water-miscible organic liquid such as ethanol to the aquasol to precipitate a substantial amount of the salt formed by the reaction of the silicate and the acid (as in the above Marshall patent), which sol may be cooled to precipitate further quantities of salt (as in the above White patent). The salt is then separated from the sol by any suitable removing operation such as filtration, centrifugation or the like, to form the initial or starting sols of this invention. These initial sols contain at least 0.1% by weight of salt and can contain as much as 5% by weight of salt in some instances. Even the minimum amount of salt makes the sols unsatisfactory for some uses, for example, in the formation of coatings or films where low electric conductivity or low water sensitivity is required. Such initial sols are also unsatisfactory in the preparation of aerogels which must be free or substantially free of electrolytes. The initial sols are usually prepared at a temperature between 0 and 15° C., but preferably at a temperature between 3 and 13° C. However, they can be contacted with the cation and anion-exchange materials hereinafter described at temperatures below 30° C., for example at temperatures of 0–30° C., although temperatures of 0–20° C. are more satisfactory. The initial sols preferably have a pH between 2 and 4 and an $SiO_2$ content, as silicic acid, of about 5 to 15% by weight.

In a preferred form or embodiment of this invention, the starting or initial acidic silica hydro-organosols are prepared by first reacting an aqueous solution of sodium silicate and aqueous sulfuric acid at a temperature between about 0 and 15° C. in such proportions and concentrations to provide an acidic silica aquasol having a pH of about 2 to 4 and containing sodium sulfate and from about 12 to 20% by weight of $SiO_2$ as silicic acid. The aquasols having a silica content over 17% by weight generally must be kept at 0–5° C. to prevent rapid gelation.

The silica aquasol thus obtained is maintained at a temperature of about 0–15° C. and a water-miscible organic liquid such as ethanol is mixed therewith to form a silica hydro-organosol containing from about 25 to 60% by weight, preferably 40 to 60% by weight, of the organic liquid and from about 5 to 11% by weight of $SiO_2$ as silicic acid. The sodium sulfate is substantially insoluble in the above sol and is thus precipitated to a substantial extent as $Na_2SO_4 \cdot 12H_2O$. On removal of this precipitated sodium sulfate by centrifugation or filtration or decantation of the sol, or the like, a sol is obtained which contains from about 0.1 to 0.6% by weight of $Na_2SO_4$ depending on the concentration of the organic liquid in the sol and the temperature of the sol.

The water-miscible organic liquid employed in preparing the initial or starting sols used in this invention can have a boiling point above that of water at atmospheric pressure if the sol is to be used, for example, in the treatment of textile or paper. For example, the higher boiling water-miscible organic liquids such as diethylene glycol, ethylene glycol, 2-ethoxyethanol, methoxyethanol, 2-butoxyethanol, monomethyl ether of diethylene glycol, monoethyl ether of diethylene glycol or monobutyl ether of diethylene glycol or the like may be employed in such instances. With this type of organic liquid those which consist of carbon, hydrogen and oxygen atoms are preferred. However, if the sols are to be employed to produce aerogels, it is necessary to employ water-miscible organic liquids, preferably those consisting of carbon, hydrogen and oxygen atoms, which have a boiling point below that of water at atmospheric pressure. As examples of suitable liquids of this category may be mentioned methanol, ethanol, isopropanol, tertiary butyl alcohol or the like. The preferred organic liquids or diluents are ethanol and acetone. The organic liquid used should be substantially neutral.

In accordance with the present invention, the residual or dissolved salt in the initial or starting silica hydro-organosols is substantially all removed by contacting such sols with a water-insoluble strong cation-exchange material which is capable of exchanging hydrogen ions for metallic cations in an acidic hydro-organo solution whereby the metallic cations of the salt are taken up by the cation-exchange material which releases hydrogen ions to the solution, and by contacting such sols with the base form of a water-insoluble weak anion-exchange material having a plurality of salt-forming nitrogen atoms which material is capable of absorbing mineral acid anions from an acidic hydro-organo solution containing such anions, under such conditions that the pH of such sols does not exceed 4.5, and is generally in the range of 2.5 to 4.0. The resulting sol contains less than 0.05% by weight but usually less than 0.025% by weight of salt and all or a portion of the mineral acid and/or an acid salt thereof present in the initial or starting sols. Thus, the resulting sol can be employed under certain conditions as hereinafter described to form aerogels containing less than 0.4% by weight but usually less than 0.1% by weight of electrolyte.

The reaction between the metallic cations in the sol and the cation-exchange material may be represented by the following equation:

$$M^+ + HR \rightarrow MR + H^+$$

where $M^+$ is a metallic cation and R is the water-insoluble portion of the cation-exchange material. It is apparent from this equation that the cation-exchange material employed herein is used in the hydrogen form or is operated on a hydrogen cycle. When this material is no longer capable of removing metallic cations from the sol it is regenerated by treatment with an acid such as sulfuric acid or hydrochloric acid to convert it to the hydrogen form. The cation-exchange material must be a "strong cation-exchange material" by which term is meant a material which will remove metallic cations from hydro-organo solutions at a pH as low as 2. These materials are of a resinous nature and are characterized by water-insolubility. They are electrolytes having an enormous non-diffusible anion and a simple diffusible cation. It is preferred that the cation be a sulfonic acid group which includes nuclear sulfonic acid groups as well as alkylene sulfonic acid groups. As examples of strong sulfonic cation-exchange resins are the water-insoluble phenolic methylene sulfonic resins such as those obtained by reacting phenol, formaldehyde and sulfuric acid or an alkali metal sulfite such as those described in U.S. 2,477,328. Still other sulfonic acid cation-exchange resins are the water-insoluble vinyl aromatic polymers containing nuclear sulfonic acid groups such as those described in U.S. 2,366,007. One of the preferred cation-exchange resins for use in accordance with this invention is the water-insoluble aromatic hydrocarbon copolymer of a mono-vinyl hydrocarbon (e.g. styrene) and a poly-vinyl aromatic hydrocarbon (e.g. divinyl benzene) containing nuclear sulfonic acid groups, e.g. the commercially available material designated "Dowex" 50 which is fully described as to its characteristics, properties and chemical constitution in Vol. 69, p. 2830, of the Journal of the American Chemical Society, November 1947. The preparation of such materials and chemical constitution thereof is also described in U.S. 2,466,675. In general the cation-exchange materials which have a titration curve similar to that shown in Figure 1, on page 88 of "Analytical Chemistry," Volume 21 (1949), are satisfactory.

The reaction between the mineral acid anions in the sol and the base form of a weak anion-exchange material may be represented by the following equations which probably represent the equilibria conditions:

(I) $H_2O + R_1-(NH_2)_x \rightarrow R_1-(NH_3)_x^+ OH^-$
$R_1-(NH_3)_x^+ OH^- + H^+A^-$
$\rightarrow R_1-(NH_3)_x^+ A^- + H_2O$ (II) $R_1-(NH_2)_x + H^+A^- \rightarrow R_1-(NH_3)_x^+ A^-$ where $A^-$ is the anion of a mineral acid, for example $Cl^-$, $SO_4^{--}$, $HSO_4^-$, $PO_4^{---}$, and $HPO_4^{--}$, and $R_1-(NH_2)_x$ is the water-insoluble portion of the weak anion-exchange material. Thus, the above equations illustrate the absorption or removal of mineral acid anions in the hydro-organosol by the use of the base form of a weak anion-exchange material composed of a plurality of salt-forming nitrogen atoms, for example, amino groups or imino groups. The anion-exchange material must be in the form of "the base form of a weak anion-exchanger" by which term is meant a material which will readily adsorb or remove mineral acid anions from a hydro-organo solution at a relatively low pH, say a pH between 2 and 4.5, but will only remove such anions slowly as the pH approaches 7.0. Strong anion-exchange materials which remove mineral acid anions at a pH above 7 cannot be used as they will adsorb silica and/or silicic acid as well as mineral acid anions from the sol. It will also be noted from Equations I and II that the removal of mineral acid anions from the sol will result in an increase in the pH of the sol. If the pH of the sol exceeds 4.5, the stability of the sol is adversely affected and the sol will tend to form an irreversible gel within a short period of time and hence be unsuitable for further use. If the gel forms in a bed of anion-exchange material, it will render the bed inoperative for further use. Hence, it is essential in the practice of this invention that the pH of the sol which is contacted with the base form of the weak anion-exchange material should not be allowed to exceed 4.5. As will be seen from the description herein this can be accomplished by the sequence in which the cation-exchange and anion-exchange material are employed and/or by the rate of flow of the sol through a bed of the anion-exchange material.

By using the base form of a water-insoluble weak anion-exchange material under the conditions described herein, it is possible to obtain the proper pH values in the sol, and the resulting sol is sufficiently fluid for further operations such as pumping, temporary storage and the like.

As examples of weak anion-exchange materials which may be employed in this invention may be mentioned the base form of weak anion-exchange materials such as water-insoluble copolymers of styrene and divinyl benzene containing nuclear amine groups or polyalkylamine groups, such as those described in U.S. 2,366,008, water-insoluble polymerized condensation products of an aromatic amine, for example, metaphenylene diamine, and formaldehyde and water-insoluble polymerized reaction products of a polyamine such as ethylene diamine, diethylene triamine and the like, with phenol and formaldehyde, such as those described in U.S. 2,341,907. As examples of commercially available weak anion-exchange materials which can be used may be mentioned "Dowex" 3 or "Amberlite" IR–45 which contain polyalkylamine groups attached to a water-insoluble styrene-divinylbenzene copolymer resin, which materials are described in U.S. 2,591,754. In general, the base form of the suitable weak anion-exchange materials has a titration curve similar to that of Figure 6 on page 8 of "Encyclopedia of Chemical Technology," Volume 8 (1952), published by the Interscience Encyclopedia, Inc., New York. Such materials generally contain a plurality of $-NH_2$, $-NHR$ or $-NR_2$ groups, where R is an aliphatic radical.

When the anion-exchange material has been used to the extent that it is no longer capable of removing mineral acid anions from the sol or removing such anions efficiently it can be regenerated, that is, converted to the base form, by treatment with, for example, a monovalent base such as $NH_4OH$. When this is done, the anion-exchange material can be used for further mineral acid anion removal from the initial or starting hydro-organosols.

In carrying out the processes of this invention, it is important, as has been noted hereinbefore, that the pH of the hydro-organosol be controlled during the cation and anion removal of the salt in the sol in order to avoid gelation of the sol, and also to remove the cations and anions as efficiently and as completely as possible. The pH conditions existing in the sol during cation and anion removal vary to some extent depending on the order in which the cation and anion-exchange materials are employed or whether they are used simultaneously. If the starting hydro-organosol is first contacted with the anion-exchange material the pH of the starting sol rises due to the removal of mineral acid anions from the sol. In order to avoid gelation of the sol it is essential to remove the sol from contact with the anion-exchange material before the pH of the sol exceeds 4.5. In view of this, it is not practical to use an acidic silica hydro-organosol at a pH of about 3.5 to 4.0 when such sol is to be contacted first with the anion-exchange material since only relatively small amounts of mineral acid anion can be removed from such sol before the pH of the sol exceeds 4.5. It is preferable, in order to obtain greater efficiency of the anion-exchange material, to employ an acidic hydro-organosol having a pH of about 1.8 to 3.5, and preferably a pH between about 1.8 and 3.0. In such instances, the sol can be maintained in contact with the anion-exchange material until the pH of the sol increases, but does not exceed 4.5. Usually satisfactory removal of the mineral acid anion is obtained when the pH of the sol is in the range of 3.5 to 4.5, preferably 3.5 to 4.0, and the sol is then removed from contact with the anion-exchange material.

The resulting sol is then contacted with the strong cation-exchanger to remove metallic cations from the sol and this results in a decrease in pH of the sol below 3.5, and usually between 1.8 and 3.3. If the resulting acidity of the sol is objectionable the pH of the sol can be increased by again contacting the sol with the base form of the weak anion-exchange material until the pH is between 3.5 and 4.5, preferably between 3.5 and 4.0. In those instances where the sol is to be used for the preparation of silica aerogels free or substantially free of salts and containing less than 0.1% by weight of electrolyte, this procedure of making the final pH adjustment of the sol without the addition of electrolytes to the sol is quite important.

When the procedure of contacting the starting hydro-organosol with the anion-exchange material and then with the cation-exchange material is used, the sol may be used directly for those applications where a salt-free or substantially salt-free sol is required. However, if the sol has a pH below 3.0 and thus contains more mineral acid than is desirable for certain uses, it can be contacted with the anion-exchange material to adjust the pH between 3 and 4.5 or between 3.5 and 4, as required, according to the procedure given above.

In another embodiment of this invention the acidic silica hydro-organosol is first contacted with the cation-exchange material. This results in the removal of metallic cations from the sol and causes a decrease in the pH of the sol which can drop to a pH of 1.8 to 2. Since, the removal of metallic cations is not efficient when the initial sol is at a low pH, it is preferred in this embodiment to employ an initial sol having a pH of about 3.0 to 4.5 and to maintain contact between the sol and cation-exchanger until the pH of the sol drops below 2.5, and preferably down to about 1.8 to 2.0. At these pH values the sol is quite stable, for example, for a period of about one week or more at temperatures below 15° C., and therefore there is little danger of gelation of the sol. The resulting sol is then contacted with the base form of the weak anion-exchange material to remove mineral acid anions from the sol. This results in an increase in the pH of the sol and it is essential that the sol be separated from the anion-exchange material before the pH exceeds 4.5 otherwise the sol is relatively unstable toward gelation and gels rather quickly even at low temperatures. The sol can be separated from the anion-exchange material at a pH between 3.0 and 4.5, and the pH of separation will depend to a large extent on the use to which the sol is put. If the sol is to be used within a relatively short period of time, for example, within 12 to 24 hours, the sol may be separated from the anion-exchange material at a pH as high as 4.5. However, if the sol is to be stored for 24 to 48 hours or more, it should be separated from the anion-exchange material at a pH of about 3.0 to 4.0.

In still another embodiment of this invention, the starting hydro-organosol is contacted with the mixture of the cation and anion-exchange material until all or substantially all of the residual salt in the hydro-organosol has been removed by the exchange materials. In carrying out this procedure the pH of the sol is generally within the range of 2.5 to 4.5, and contact is maintained with the mixture of exchange materials until the salt content of the sol is less than 0.05% by weight, provided that the sol is separated from the exchange materials in the event that the pH of the sol begins to rise to a value above 4.5. If the pH of the sol exceeds 4.5, the sol is apt to gel before it can be separated from the exchange materials or else has a short storage life. In this embodiment of the inventtion, the starting hydro-organosol is preferably passed through a mixed bed of the anion and cation-exchange materials while controlling the rate of flow of sol so as to maintain the pH of the effluent from the bed between 2.5 and 4.5, and preferably between 3.5 and 4.0 to obtain favorable ion-exchange efficiency of each exchange material. By operating in this manner, the sol obtained from the bed of exchange materials contains less than 0.05% by weight of the salt present in the starting hydro-organosol.

When the mixed bed of exchange materials is exhausted, that is, not capable of removing further quantities of salt efficiently, it can be regenerated by first separating the anion and cation-exchange material. This may be accomplished by a hydraulic separation whereby the exchange materials are suspended in water and thus separate into two different layers because of the difference in density of the anion and cation-exchange materials. After the anion and cation-exchange materials have been separated from each other they can be individually regenerated as hereinbefore described and then mixed together for further treatment of a starting hydro-organosol.

The starting hydro-organosol can be contacted with the ion-exchange materials in a variety of ways. For example, the exchange material can be added to the sol and then removed from the sol by filtration, centrifugation or the like when the desired pH has been attained, or the exchange material can be suspended in a moving stream of the sol in the form of a fluidized bed and subsequently separated from the sol, or the sol can be passed through a fixed bed of the exchange material. The latter procedure is preferred since it enables accurate and efficient control of the pH of the sol. When a fixed bed or beds of the exchange material are used, the movement of the sol through the bed may be downward or upward. However, from the standpoint of simplicity of operation, it is desirable to allow the sol to flow downwardly by gravity through the bed of exchange material, but this is not necessarily the most efficient procedure. If the hydro-organosol is cloudy or contains suspended matter, it is preferred to remove the suspended matter therefrom before passing it through a bed of the exchange material. This is suitably accomplished in the case of sols containing particles of gel or other solid matter larger than colloidal size by filtration, centrifugation or the like, and is preferably done by passing the sol through a sand filter.

Silica aerogels can be produced from the hydro-organosols from which the salt has been removed by the use of the anion and cation-exchange materials, but in some instances it is necessary to treat the sol or adjust the pH of the sol before forming the aerogels. Thus, if the pH of the sol as obtained from the exchange materials is between 3.3 and 4.0 the sol can be used directly in the production of aerogels without further treatment. On the other hand, if the pH of the sol is less than 3.3, that is between about 2.0 and 3.3, it is generally necessary to treat the sol in some manner otherwise the production of an aerogel therefrom will result in excessive corrosion of the equipment used in producing an aerogel or the aerogel produced will contain more free mineral acid than is desirable, particularly when the free mineral acid is a relatively non-volatile acid such as sulfuric acid. The treatment of the sol can be effected in several ways to avoid these conditions. In one procedure, the sol is treated with a water-soluble alkaline ammonium salt such as ammonium bicarbonate to adjust the pH between 3.3 and 4.0. This procedure causes some gel particles to form in the sol which show up as white specks in the aerogel produced therefrom and hence is not as satisfactory as the other procedure described below. Although this procedure introduces some salt into the sol the ammonium salt decomposes during formation of aerogel from the sol and does not appear in the aerogel produced. In another procedure, the sol is contacted with the base form of the anion-exchange materials, hereinbefore described, until the pH of the sol is between 3.3 and 4.0, after which the sol is separated from the anion-exchange material. This procedure is preferred since it provides a sol from which excellent aerogels can be produced.

In preparing silica aerogels, the sol having a pH of 3.3 to 4.0 can be charged to an autoclave and the liquid phase removed therefrom by the procedure described in the Marshall patent hereinbefore referred to. The liquid phase of the sol can also be removed continuously from the sol to form an aerogel by pumping the sol under pressure into a heated tube, the other end of which is provided with a hot let-down valve, in which tube the sol is heated to or above the critical temperature of the liquid phase of the sol, and the silica aerogel and vapors formed in the tube are released through the let-down valve and then separated from each other while preventing condensation of the vapors on the aerogel.

In general, silica aerogels are prepared from the acidic hydro-organosols having a pH of 3.3 to 4.0 and which are free or substantially free of salts by first heating such sols in a pressure-resistant vessel. When such sols are charged to a pressure-resistant vessel and then heated, the sol is first converted to a gel in situ and the removal of the liquid phase from the gel is accomplished in the same manner as in the case of an hydro-organogel, for example, as in the process of the Kistler patent hereinbefore referred to. Thus, the liquid phase is removed without subjecting the hydro-organogel formed in situ to a substantial compressive liquid-solid interface.

In carrying out the removal of the liquid phase from the gel formed in situ, it is necessary to heat the gel in a closed zone or system in which the pressure may be controlled as desired, for example, in an autoclave or heated tube of the type previously described, until the temperature of the vapor of the liquid phase of the gel is near or above the critical temperature of the liquid phase. The temperature of the gel is raised until it is at least at the temperature where substantially all of the liquid phase of the gel has been converted to a vapor, and thereafter vapor can be released slowly from the closed system so as not to injure the gel structure. This temperature can be about 30° C. below the critical temperature of the liquid phase of the gel or near or at the critical temperature or above the critical temperature of the liquid phase of the gel, depending on the particular organic liquid and concentration thereof present in the liquid phase of the gel. The temperature is then maintained or raised, as desired, while releasing vapor slowly until essentially all of the vapor is released from the closed system.

Although, as pointed out above, the temperature can be as much as 30° C. below the critical temperature of the liquid phase of the gel, satisfactory aerogels can be obtained at such a temperature. On the other hand, some shrinkage of the gel does occur, and it is preferred to avoid this shrinkage by operating at least at the critical temperature of the liquid phase of the gel. Higher temperature can also be used, for example, temperatures up to about 500° C., but it is preferred not to exceed a temperature of about 450° C.

In charging the silica hydro-organosol to the closed system prior to heating, it is desirable that the sol should occupy about 50 to 75% of the volume of the system. If the volume occupied by the sol is too small there is a tendency for excessive shrinkage during heating. On the other hand, if the volume occupied is too large there is a danger that the vessel or autoclave used may be damaged by hydrostatic pressure.

In general, the silica aerogels prepared according to the process of this invention have physical properties which are very similar to the aerogels of the Marshall, White and Kistler patents hereinbefore referred to. However, they are distinctive from such prior art aerogels in that they are free or substantially free of salts. Thus, the silica aerogels of this invention generally contain less than 0.4% by weight of salts, whereas such prior art aerogels usually contain a minimum of 1% by weight of salts. The silica aerogels of this invention also contain small amounts of acids and/or acid alkali metal salts such as sulfuric acid and/or sodium acid sulfate uniformly distributed through the aerogel, the amounts of acid or salt being such as to give a pH of 3.3 to 4.0 when the aerogel is suspended in distilled water, but insufficient to provide a total electrolyte content in excess of 0.4% by weight, based on the silica aerogel.

The aerogels of the present invention can be used in the normal way, that is, for thermal insulation, for flatting lacquers and varnishes, for thickening greases and the like, but they are especially useful for application where the low electrical conductivity of such aerogels is of importance. Thus, these aerogels are particularly useful as reinforcing fillers in silicone rubbers or in other rubbers, which are used as electrical insulators.

A further understanding of the processes and products of the present invention will be obtained from the following specific examples which are intended to illustrate the invention, but not to limit the scope thereof, parts and percentages being by weight unless otherwise specified.

*Example 1*

Five and eight-tenths liters of an acidic silica ethanol-aquasol at a temperature of 20° C. and having a colloidal silica content of 9.5%, a sodium sulfate content of 0.3%, an ethanol content of 50%, a water content of 40%, and containing sufficient free sulfuric acid to provide a pH of about 3.0 (glass electrode) was passed downwardly by gravity flow through a column (3.5 centimeters in diameter by 15 centimeters high) of the hydrogen or acid form of "Dowex" 50 (a strong cation-exchange resin consisting of water-insoluble beads of a copolymer of styrene and divinyl benzene, which copolymer contains nuclear sulfonic acid groups), which is described in Volume 69, p. 2830, of the Journal of the American Chemical Society, at the rate of about 10 milliliters per minute. This cation-exchange resin had a capacity of 4.25 Me. (milligram equivalents) per gram. The pH (glass electrode) of the ethanol-aquasol was lowered to about 2.0 by this treatment, and this effluent was substantially free of sodium ions as evidenced by the fact that it gave a negligible flame test for sodium.

One gallon of the effluent from the cation-exchange resin was placed in a glass container and was vigorously stirred while a total of 280 grams of the base form of "Amberlite" IR–45, a weak anion-exchange resin consisting of water-insoluble beads of the reaction product of diethylene triamine and a chloromethylated copolymer of styrene and divinyl benzene which product is characterized by a plurality of polyalkylamine groups and having a capacity of 6.0 me. per gram, were added. When the pH of the sol reached 3.7 (glass electrode), stirring was discontinued and the anion-exchange was quickly separated from the sol by filtration through a 60 mesh sieve. The resulting sol gave no visible precipitate when a portion thereof was tested with barium chloride solution. The amount of silica adsorbed by the ion-exchange resins was negligible, and the sol remained in a fluid, pumpable condition for at least 24 hours. The pH of the sol was due primarily to a small residual amount of sulfuric acid and $NaHSO_4$.

The sol thus obtained was charged to an autoclave, while the sol was still fluid, until 75% of the volume of the autoclave was occupied by the sol. The autoclave was then closed and heated until a pressure of 1900 pounds per square inch (gauge) was attained (which was slightly above the critical pressure), during which time the sol was converted to an ethanol-aquagel in situ. Heating of the autoclave was continued and ethanol-water vapor was released intermittently from the autoclave to maintain the pressure at 1900 pounds per square inch (gauge) until a temperature of 300° C. was attained, which was above the critical temperature. The vapor in the autoclave was released slowly and the autoclave was then cooled. A silica aerogel of excellent quality was obtained. A slurry of 5 grams of this aerogel with 395 milliliters of distilled water has a specific conductivity of $1.14 \times 10^{-5}$ reciprocal ohms at 26° C., corresponding to an equivalent sodium sulfate content of less than 0.1%. The silica aerogel contained a small amount of sulfuric acid and $NaHSO_4$ uniformly distributed therein, and the water slurry of the aerogel had a pH of about 4.

Example 2

Five and eight-tenths liters of an acidic silica ethanol-aquasol as described in the first paragraph of Example 1 was first filtered through a sand filter and then passed downwardly by gravity flow through a fixed bed in the form of a column (17 millimeters in diameter and 610 millimeters high) of beads of the hydrogen or acid form of "Amberlite" IR–120 (which is a strong cation-exchange resin consisting of a water-insoluble copolymer of styrene and divinyl benzene having a plurality of nuclear sulfonic acid groups and a capacity of 4.20 me. per gram), at the rate of 15 milliliters per minute. The effluent from the column was collected until the total effluent had a pH of 2.0 (glass electrode). The flow of the sol through the column was then discontinued. A small portion of this effluent was tested and was found to contain a negligible amount of sodium by the flame test.

The balance of the effluent from the cation-exchange resin was next passed downwardly by gravity flow through a fixed bed in the form of a column (17 millimeters in diameter and 610 millimeters high) of beads of the base form of "Amberlite" IR–45 which is a weak anion-exchange resin consisting of a water-insoluble reaction product of diethylene triamine and the chloromethylated copolymer of styrene and divinyl benzene which product is characterized by containing a plurality of polyalkylamine groups and having a capacity of 6.0 me. per gram), at the rate of 20 to 27 milliliters per minute. As soon as the pH of the total effluent from the column reached 3.7 (glass electrode), the flow of sol through the column was discontinued and the column was immediately washed free of sol with water to prevent gelation of the sol in the column. The specific conductivity of the sol (effluent) from the anion-exchange column was $3.8 \times 10^{-5}$ to $6.1 \times 10^{-5}$ reciprocal ohms at 25° C. The pH of the sol was about 3.8 due primarily to the presence of a small amount of sulfuric acid. A flame test on the sol showed negligible sodium ion concentration, and no precipitate was observed when a portion of the effluent was treated with a dilute aqueous barium chloride solution.

The above sol was converted to a silica aerogel using the procedure described in the last paragraph of Example 1. An aerogel of excellent quality was obtained having a small amount of sulfuric acid and $NaHSO_4$ distributed uniformly therein. A slurry of 5 grams of this aerogel in 395 milliliters of water had a pH of 4.0 (glass electrode) and a specific conductivity of $1.25 \times 10^{-5}$ reciprocal ohms at 25° C. which corresponds to an equivalent sodium sulfate content of less than 0.1%.

Example 3

Two and nine-tenths liters of an acidic ethanol-aquasol at a temperature of 20° C. and having a silica content of 9.4% as colloidal silicic acid, a sodium sulfate content of 0.6%, an ethanol content of 45%, a water content of 45% and containing sufficient free sulfuric acid to provide a pH of about 3 (glass electrode), was first filtered through a sand filter and then passed downwardly by gravity flow through a column, 17 millimeters in diameter and 1220 millimeters high, of a thoroughly mixed bed of particle containing equal capacities of the hydrogen form of "Amberlite" IR–120 cation-exchange resin and the base form of "Amberlite" IR–45 weak anion-exchange resin (both of which resins are described in Example 2). The rate of flow of the sol through the column was adjusted to provide an effluent having a pH between 3.5 and 4.0 (glass electrode). This effluent was stable at 25° C. for at least 24 hours during which time it has capable of being pumped or stored without material change in viscosity.

The above effluent was charged to an autoclave until it occupied 60% of the volume of the autoclave. The autoclave was then closed and heated until the pressure in the autoclave was about 1980 pounds per square inch (gauge), which was slightly below the critical pressure of the liquid phase, during which time the sol was converted to an ethanol-aquagel. Heating of the autoclave was continued while releasing vapor from the auoclave slowly to maintain the above pressure, until the temperature of the gel was about 300° C. which was slightly below the critical temperature of the liquid phase of the gel. This temperature was maintained while the vapor in the autoclave was released slowly, and the autoclave was then cooled. A silica aerogel of good quality was obtained, which aerogel had an electrolyte content, as equivalent sodium sulfate, below 0.1%.

Example 4

An acidic silica ethanol-aquasol was prepared by gradually adding with vigorous stirring about 630 grams of an aqueous solution containing 20% of sodium silicate having an $Na_2O$ to $SiO_2$ ratio of 3.2 to 1, to 176 grams of an aqueous solution containing 34.6% of $H_2SO_4$. When the pH of the resulting solution increased to 2.5 (glass electrode), the addition of the sodium silicate solution was discontinued and ethanol was added gradually until the ethanol comprised 50% of the resulting sol. All of the above ingredients were stored in glass containers which were immersed in an ice bath before actual mixing of the ingredients at 6° C., and the sodium sulfate crystals which precipitated out upon the addition of the ethanol were filtered from the sol at a sol temperature of 6° C. The sodium sulfate content of this silica ethanol-aquasol was 0.12%.

This ethanol-aquasol was allowed to flow downwardly by gravity flow at the rate of 9 milliliters per minute through a column of particles, the column being 1 centimeter in diameter and 28 centimeters high, of the base form of "Amberlite" IR–45, a weak anion-exchange resin (described in Example 2). The effluent was collected until the pH thereof (glass electrode) was between 3.7 and 4.0, after which flow through the column was discontinued and the sol in the column was immediately drained from the resin and the resin washed with water. A 2 milliliter sample of the effluent at a pH of 3.7–4.0 gave no visible precipitate or turbidity when treated with one drop of 1 M aqueous barium chloride solution.

The effluent from the anion-exchange column was next passed downwardly by gravity through a column of particles, the column being 1 centimeter in diameter and 28 centimeters high, of the hydrogen form of "Dowex" 50, a strong cation-exchange resin, which resin consisted of a water-insoluble copolymer of styrene and divinyl benzene containing a plurality of nuclear sulfonic acid groups, described in Volume 69, p. 2830 of the Journal of the American Chemical Society, and had a capacity of 425 me. per gram. The rate of flow of the sol through the cation-exchange column was 10 milliliters per minute, and the flow was continued until the pH (glass electrode) of the total effluent was 3.0. The specific resistance of this effluent was 20,000 ohms. A portion of this effluent was subjected to a flame test and gave a negligible yellow coloration indicating the substantially complete removal of sodium ion.

The effluent sol from the cation-exchange column was charged to an autoclave and converted to a silica aerogel using the procedure described in the last paragraph of Example 1. A silica aerogel of excellent quality was obtained, which aerogel contained less than 0.1% of electrolyte.

*Example 5*

Experiments were carried out as described in Examples 1 through 4 with the exception that the starting sols contained acetone instead of ethanol, but were otherwise identical with the starting sols of the preceding examples. After treatment with the cation-exchange materials and anion-exchange materials the acidic silica acetone-aquasols contained less than 0.01% of electrolyte equivalent to sodium sulfate. Also the silica aerogels prepared from the acidic silica acetone-aquasols were comparable in quality to the aerogels prepared from acidic ethanol-aquasols, and contained less than 0.1% of electrolyte.

This application is a continuation-in-part of my copending application Serial No. 547,835, filed November 18, 1955, now abandoned.

What is claimed is:

1. A process of decreasing the salt content of an acidic silica hydro-organosol containing salts which comprises contacting at a temperature below 30° C. an acidic silica hydro-organosol containing water, from about 5 to 12% by weight of silica as silicic acid, from about 25 to 60% by weight of a substantially neutral water-miscible organic liquid consisting of carbon, hydrogen and oxygen atoms, at least 0.1% by weight of a salt of a mineral acid and an alkali silicate and a mineral acid in an amount sufficient to provide a pH of 1.8 to 4.5, with the hydrogen form of a water-insoluble strong cation-exchange sulfonated polymerizate and the base form of a water-insoluble weak anion-exchange material containing a plurality of salt-forming nitrogen atoms, until the hydro-organosol contains less than 0.025% by weight of said salt, said hydro-organosol being removed from contact with said anion-exchange material before the pH of the sol exceeds 4.5.

2. A process as in claim 1, but further characterized in that the organic liquid is ethanol and said salt is sodium sulfate.

3. A process as in claim 1, but further characterized in that the organic liquid is acetone and said salt is sodium sulfate.

4. A process of decreasing the sodium sulfate content of an acidic silica hydro-organosol containing sodium sulfate which comprises contacting at a temperature below 30° C. an acidic hydro-organosol containing from about 0.1 to 0.6% by weight of sodium sulfate, from about 5 to 12% by weight of silica as silicic acid, from about 25 to 60% by weight of a substantially neutral water-miscible organic liquid having a boiling point below that of water at atmospheric pressure and consisting of carbon, hydrogen and oxygen atoms, the remainder of the sol consisting substantially of water and sulfuric acid in an amount to provide a pH between about 2 and 4, with the hydrogen form of a water-insoluble, strong cation-exchange material to remove substantially all of the sodium ions of the sodium sulfate from the sol, thereby obtaining a hydro-organosol having a pH between about 1.8 and 2.5, and thereafter contacting the resulting sol at a temperature below 30° C. with the base form of a water-insoluble, weak anion-exchange material containing a plurality of salt-forming nitrogen atoms to remove substantially all of the sulfate ions of said sodium sulfate, and removing said sol from contact with said anion-exchange material while the pH of the sol is between 3.0 and 4.0, the said acidic silica hydro-organosol so prepared having a sodium sulfate content of less than 0.025% by weight.

5. A process as in claim 4, but further characterized in that the organic liquid is ethanol.

6. A process as in claim 4, but further characterized in that the organic liquid is acetone.

7. A process of decreasing the sodium sulfate content of an acidic silica hydro-organosol containing sodium sulfate which comprises passing an acidic silica hydro-organosol at a temperature below 30° C. and containing from about 0.1% to 0.6% by weight of sodium sulfate, from about 5 to 12% by weight of silica as silicic acid, from about 25 to 60% by weight of a substantially neutral water-miscible organic liquid having a boiling point below that of water at atmospheric pressure and consisting of carbon, hydrogen and oxygen atoms, the remainder of the sol consisting substantially of water and sulfuric acid in an amount to provide a pH between about 2 and 4, through a mixed bed of the hydrogen form of a water-insoluble, strong cation-exchange sulfonated polymerizate and the base form of a water-insoluble weak anion-exchange material containing a plurality of salt-forming nitrogen atoms and controlling the rate of flow through said bed to provide an effluent having a pH between about 2.5 and 4.0, whereby a hydro-organosol is obtained which contains less than 0.025% by weight.

8. A process of decreasing the sodium sulfate content of an acidic silica hydro-organosol containing sodium sulfate which comprises contacting at a temperature below 30° C. an acidic silica hydro-organosol containing from about 0.1 to 0.6% by weight of sodium sulfate, from about 5 to 11% by weight of silica, as silicic acid from about 25 to 60% by weight of a substantially neutral water-miscible organic liquid having a boiling point below that of water at atmospheric pressure and consisting of carbon, hydrogen and oxygen atoms, the remainder of the sol consisting substantially of water and sulfuric acid in an amount to provide a pH of about 1.8 to 3.5, with the base form of a water-insoluble, weak-anion-exchange material containing a plurality of salt-forming nitrogen atoms until the pH of the sol does not exceed 4.5, and thereafter contacting said sol at a temperature below 30° C. and before appreciable change in the viscosity occurs with the hydrogen form of a water-insoluble strong cation-exchange material until substantially all of the sodium ions are removed from said sol and said sol has a pH between about 1.8 and 3.3, the said acidic silica hydro-organosol so prepared having a sodium sulfate content of less than 0.025% by weight.

9. A process as in claim 8, but further characterized in that the organic liquid is ethanol.

10. A process as in claim 8, but further characterized in that the organic liquid is acetone.

11. A process of decreasing the sodium sulfate content of an acidic silica alcosol containing sodium sulfate which comprises contacting at a temperature below 30° C. an acidic silica alcosol containing water, at least 0.1% by weight of sodium sulfate, from about 5 to 12% by weight of silica, from about 25 to 60% by weight of ethanol and an amount of sulfuric acid to provide a pH between about 2 and 4.5, with the hydrogen form of a water-insoluble strong cation-exchange resin containing sulfonic acid groups and the base form of a water-insoluble, weak anion-exchange resin containing radicals selected from the group consisting of —NH$_2$, —NHR and —NR$_2$ radicals, where R is an aliphatic radical, until the starting acidic silica alcosol is substantially free of sodium sulfate, said acidic silica alcosol being separated from said anion-exchange resin before the pH of the sol exceeds 4.5, the said acidic silica alcosol so prepared having a sodium sulfate content of less than 0.025% by weight.

References Cited in the file of this patent

UNITED STATES PATENTS

| | | |
|---|---|---|
| 2,244,325 | Bird | June 3, 1941 |
| 2,285,449 | Marshall | June 9, 1942 |
| 2,285,477 | White | June 9, 1942 |
| 2,577,484 | Rule | Dec. 5, 1951 |

FOREIGN PATENTS

| | | |
|---|---|---|
| 611,914 | Great Britain | Nov. 5, 1948 |